United States Patent [19]

Hulsey

[11] Patent Number: 4,816,346
[45] Date of Patent: Mar. 28, 1989

[54] SCREW FASTENER BLANK

[75] Inventor: Tommy R. Hulsey, Wyomissing, Pa.

[73] Assignee: Construction Fasteners, Inc., Wyomissing, Pa.

[21] Appl. No.: 110,189

[22] Filed: Oct. 19, 1987

Related U.S. Application Data

[62] Division of Ser. No. 53,051, May 22, 1987, Pat. No. 4,736,481.

[51] Int. Cl.⁴ .............................................. F16B 35/00
[52] U.S. Cl. ................................. 428/582; 428/577; 428/583
[58] Field of Search ............... 428/577, 582, 583, 585; 10/10 R, 27 R, 140, 141 F; 408/226, 227, 228, 229, 230; 411/383, 386, 387, 900

[56] References Cited

U.S. PATENT DOCUMENTS

| | | | |
|---|---|---|---|
| 335,133 | 2/1886 | Jones | 428/577 |
| 398,912 | 3/1889 | Thomson | 10/27 R |
| 910,434 | 1/1909 | Thompson | 411/900 |
| 1,262,975 | 4/1918 | Pierce | 10/27 R |
| 1,462,775 | 7/1923 | Trivelloni | 10/27 R |
| 1,554,336 | 9/1925 | Lupotterie | 428/583 |
| 1,720,722 | 7/1929 | Dean | 428/585 |
| 1,765,516 | 6/1930 | Whitney | 10/27 R |
| 2,153,702 | 4/1939 | Tiyhe | 10/27 R |
| 2,406,327 | 8/1946 | Friedrich | 10/10 R |
| 2,525,258 | 10/1950 | Fabrizio | 10/141 F |
| 2,962,813 | 12/1960 | Freidler | 428/577 |
| 3,611,862 | 10/1971 | Walker | 10/27 R |
| 3,924,508 | 12/1975 | DeCaro | 10/10 R |
| 4,003,175 | 1/1977 | Patry | 411/456 |

Primary Examiner—John J. Zimmerman
Attorney, Agent, or Firm—Leonard M. Quittner

[57] ABSTRACT

A bi-metallic screw fastener blank for a self drilling screw of a given root diameter is disclosed. The screw blank comprises a metallic head and shank member made of a first material that is welded to a metallic slug member that is of equal diameter to the head and shank member but is made of a second material which is heat hardenable. The blank is characterized by an annular groove at the weld interface between the head and shank member and the slug member that has a diameter equal to the given root diameter of the screw.

6 Claims, 1 Drawing Sheet

SCREW FASTENER BLANK

FEDERALLY-SPONSORED RIGHTS

The invention herein was made without any Federal sponsorship or contribution.

CROSS-REFERENCE

This is a divisional application of my copending application Ser. No. 07/053,051 filed on May 22, 1987 now U.S. Pat. No. 4,736,481.

BACKGROUND OF THE INVENTION

1. The Field of the Invention.

The field of the invention relates to an improved screw fastener blank and its components. The blank has a head and shank portion of corrosion resistant material to which is adhered and made integral therewith a drill slug portion of a different material.

2. Description of the Prior Art.

U.S. Pat. Nos. 751,258 to Carstens (Feb. 2, 1904); 3,180,126 to Carlson (Apr. 27, 1965) and 3,978,760 to Muenchinger (Sept. 7, 1978) which teach self-tapping fasteners; U.S. Pat. Nos. 3,204,516 to Weiber (Sept. 7, 1965) and 3,207,024 to Sommer (Sept. 21, 1965) which teach fabrication of drill points on screw ends; U.S. Pat. Nos. 3,585,894 to Brown (June 22, 1971); 4,257,307 to Regensberger (Mar. 24, 1981) and 4,480,951 to Regensberger (Nov. 6, 1984) which teach fabrication of self-drilling and tapping screw fasteners; U.S. Pat. Nos. 1,765,516 to Whitner (June 24, 1930); 3,611,862 to Walker (Oct. 12, 1971) and 4,003,175 to Patry (Jan. 18, 1977) which teach the use of bi-compositional fasteners, connectors and parts generally and Nos. 910,434 to Thompson (Jan. 19, 1909) and 2,153,702 to Tighe (Apr. 11, 1939) which teaches fabrication of bi-metallic screw fasteners and U.S. Pat. No. 3,924,508 to DeCaro (Dec. 9, 1975) which teaches a bi-metallic drill screw.

The desirability of a bi-compositional screw fastener which is self-drilling and tapping has long been apparent. Such a fastener would embody the properties of each material where it is used. For example, the head and shank portions may be exposed to heat or a corrosive atmosphere, or require a desired finish which is exposed to view while the drill and unexposed portions might require hardness, thread forming capability or holding power but not require corrosion resistance or beauty.

Joinder of components of dissimilar materials, metals or alloys pose problems inherent in their differences. Thompson (U.S. Pat. No. 910,434) discusses the butt welding of the screw portion of a screw blank to be composed of, for example, brass to steel. U.S. Pat. No. 910,434 teaches that different conductivities can be overcome by reducing the contact surface area of the material with the higher conductivity inverse proportionately to the welding area of the material with the lower conductivity so that the heat of resistance welding wil rise relatively more quickly in the part with poorer conductivity thereby effecting a sound weld. In addition to being inaccurate as to be conductivity vs. surface area, such a process will inevitably create a flash of excess weld material in the vicinity of the weld interface, see U.S. Pat. No. 910,434, FIG. 2, which must be eliminated by grinding. This problem is not solved by Tighe (U.S. Pat. No. 2,153,702), p. 2, col 2, lines 13 and 14. See also, FIG. 3 of the present invention. The flash may be disposed of without grinding if the screw blank is cut with threads. In thread rolling such excess is undesirable.

DeCarlo (U.S. Pat. No. 3,924,508) teaches a method of joinder which uses inertial or friction welding to overcome the problem of different conductivities. The process disclosed requires specialized equipment in manufacture to impart an extremely high speed rotational component to the part to be joined and one component part must have a formed recess in the fixed part to receive the welding flash.

The present invention accomplishes joinder with conventional butt welding equipment and leaves a blank suitable for thread rolling.

SUMMARY OF THE INVENTION

The invention described herein is summarized as a screw fastener blank formed from a screw member of a first composition having a head and shank and a welding surface opposite the head which is planar and at a right angle to the longitudinal axis of the blank and a drilling slug member of a second composition which may have formed on one end a drilling tip and on its welding end a cone. The screw member and slug are brought into welding contact and butt welded as the slug is moved longitudinally toward the screw portion. In welding, the cone compresses and dissolves into the material behind the planar surface to form a continuous screw blank leaving an annular groove at the screw/slug interface which is equal to the defined root diameter of the finished screw. Thereafter, the blank may be thread rolled with the weld interface overridden in the rolling process to expose a uniform surface defined by the root diameter. The slug portion may be hardened if a drill tip is formed thereon at any appropriate step.

An object of the invention is to provide a bicompositional screw fastener blank adapted for thread rolling using conventional butt welding equipment.

A further object of the invention is to provide a bicompositional screw blank adapted for thread rolling which requires no secondary grinding or finishing.

A further object of the invention is to provide a process for manufacturing at high speed a blank for a bicompositional self-drilling and tapping screw.

DESCRIPTION OF DRAWINGS

The present invention may be better understood by reference to the drawings wherein six (6) figures are shown on one (1) sheet. The numbers shown on the drawings for the various parts of the invention are consistent throughout so that a number indicating a part in one drawing will indicate the same part in another drawing.

DESCRIPTION OF THE PREFERRED EMBODIMENT

Figure 1:
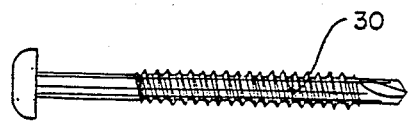
FIG. 1 shows a longitudinal view of typically a bi-metallic screw fastener made from a screw blank of the invention.
Figure 2A:
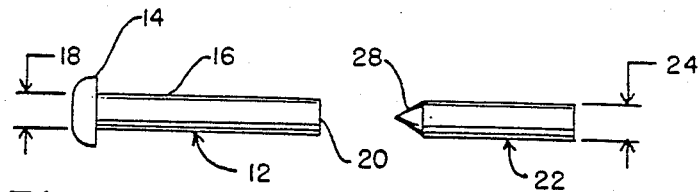
FIGS. 2a–c show how the screw blank and drill slug are butt welded in the present invention.

As to the product, the preferred embodiment is described as comprising a screw blank 10 with a screw member 12 of a non-corroding or corrosion resistant metal such as austenic or 18-8 stainless stell having a head 14, a shank 16, a defined pre-rolling diameter 18 and having a planar welding surface 20 at a right angle to the longitudinal aixs of the screw blank. The screw blank has a slug member 22 typically of a hardenable low carbon steel, of a defined length and a diameter 24 equal to the blank diameter, with a cone shaped lug 28 formed on one end and a drilling tip 26 which may be formed longitudinally on the other. See FIG. 2a.

Figure 2B:
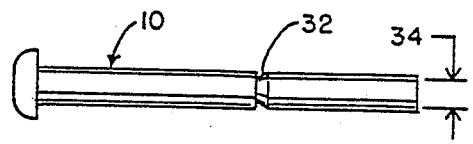
Figure 2C:
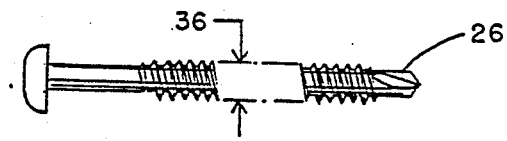
Figure 2D:
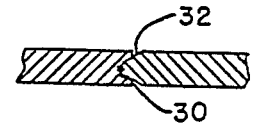
FIG. 2d is a blow-up view of the weld interface.
Figure 3:
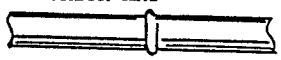
FIG. 3 shows the butt welded screw blank and drill slug interface according to the prior art.

Attention is directed to FIGS. 2b-c. The slug is advanced cone side to the planar surface of the blank and butt welded at the interface 30 of the two members such that the cone is dissolved by the heat of welding into the blank with the slug adhering thereto, see FIG. 2b, leaving an annular groove 32 having a diameter 34 equal to the defined root diameter of the screw fastener. Thereafter the carbon steel end of the screw blank may have a drill tip formed thereon which may be hardened by annealing and quenching means. The screw blank may also be thread rolled to the defined root diameter and major diameter 36.

The process comprises of the steps of compressing together along their longitudinal axes cone to plane, a headed screw blank member made typically of 18-8 stainless steel to a slug member made typically of hardenable low carbon steel; applying an electric welding current to the members in contact; dissolving the cone into the screw member by means of the heat of welding; leaving an annular groove equal to the defined root diameter of the screw.

I claim:

1. A bi-compositional screw fastener blank for making a screw, comprising:
   a. a screw member having a screw head and a shank and made of a first composition, the screw member having a defined thread rolling diameter and a planar surface opposite the head at a right angle to the blank's longitudinal axis and
   b. a cylindrical bar shaped slug member made of a second composition and having had a conical lug formed on one end which lug having been dissolved by welding means into the screw member at the planar surface and leaving an annular groove which has a diameter equal to a predetermined defined root diameter of the screw.

2. A screw fastener blank as in claim 1 wherein the first composition is corrosion resistant.

3. A screw fastener blank as in claim 2 wherein the corrosion resistant composition is austenitic steel.

4. A screw fastener blank as in claim 3 wherein the austenitic steel is 18-8 stainless steel.

5. A screw fastener blank as in claim 1 wherein the second composition is hardenable.

6. A screw fastener blank as in claim 5 wherein the hardenable composition is low carbon steel.

* * * * *